(12) United States Patent
Chuang

(10) Patent No.: US 7,649,420 B2
(45) Date of Patent: Jan. 19, 2010

(54) FREQUENCY DETECTING AND CONVERTING APPARATUS

(75) Inventor: Chiao-Tung Chuang, Chung Li (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 606 days.

(21) Appl. No.: 11/593,106

(22) Filed: Nov. 6, 2006

(65) Prior Publication Data

US 2007/0121770 A1    May 31, 2007

(30) Foreign Application Priority Data

Nov. 7, 2005    (TW) .............................. 94138916 A

(51) Int. Cl.
  *H03L 7/00* (2006.01)
(52) U.S. Cl. .................... 331/1 R; 331/1 A; 331/74; 327/156; 327/159; 375/376
(58) Field of Classification Search ................. 331/1 A, 331/74, 1 R; 327/156, 159; 375/376
See application file for complete search history.

(56) References Cited

U.S. PATENT DOCUMENTS 7,129,789 B2 * 10/2006 Hsiao et al. ................. 331/1 A
7,551,009 B2 *  6/2009 Garlapati et al. ............ 327/115

* cited by examiner

*Primary Examiner*—Arnold Kinkead
(74) *Attorney, Agent, or Firm*—Muncy, Geissler, Olds & Lowe, PLLC

(57) ABSTRACT

A frequency detecting and converting apparatus comprises a plurality of frequency-dividers, a multiplexer, a pulse width detector, a comparing unit and an encoder. The invention automatically detects the operating frequency of an input clock signal, divides the frequency of the input clock signal by a pre-defined integer according to the detected operating frequency and finally generates an output clock signal with an operating frequency required for an integrated circuit.

8 Claims, 4 Drawing Sheets

| S (Number of cycle) | $f_2$ |
|---|---|
| K*CYC_sys *(0.5)< S <K*CYC_sys*(1.5) | $f_1$ |
| K*CYC_sys *(1.5)< S <K*CYC_sys*(2.5) | $f_1/2$ |
| K*CYC_sys *(2.5)< S <K*CYC_sys*(3.5) | $f_1/3$ |
| K*CYC_sys *(3.5)< S <K*CYC_sys*(4.5) | $f_1/4$ |
| K*CYC_sys *(7.5)< S <K*CYC_sys*(8.5) | $f_1/8$ |
| K*CYC_sys *(9.5)< S <K*CYC_sys*(10.5) | $f_1/10$ |

FIG. 5

FREQUENCY DETECTING AND CONVERTING APPARATUS

This application claims the benefit of the filing date of Taiwan Application Ser. No. 094138916, filed on Nov. 7, 2005, the content of which is incorporated herein by reference.

BACKGROUND OF THE INVENTION

1. Field of the Invention

The present invention generally relates to the field of clocks and, more specifically to a frequency detecting and converting apparatus for automatically detecting the frequency of an input clock signal and then dividing the frequency to a desired frequency required for an integrated circuit (IC).

2. Description of the Related Art

Generally, main operating frequency of IC is fixed. For example, a universal serial bus (USB) controller normally operates at 6 MHz (low speed) or 48 MHz (high speed). Thus, a clock frequency provided to the USB controller is generated by an oscillator having a frequency of 6 MHz or 48 MHz. Instead, an output clock frequency of an oscillator having a frequency of 6 MHz or 12 MHz is multiplied with a phase-locked-loop up to a resultant clock frequency of 48 MHz.

Oscillators on the market usually are restricted to different sizes, selling prices and popularity with respect to different frequencies. If an IC is limited to use an oscillator having a fixed frequency, the flexibility in production and application may lessen as the oscillator is in a short supply or has a big size.

SUMMARY OF THE INVENTION

In view of the above-mentioned problems, an object of the invention is to provide a frequency detecting and converting apparatus for generating a frequency-divided clock with a desired frequency to an IC if the frequency of an input clock signal is a multiple of that of the operating clock frequency of the IC.

To achieve the above-mentioned object, the frequency detecting and converting apparatus comprises a plurality of frequency dividers, a multiplexer, a pulse width detector, a look-up table, a comparing unit and an encoder. The pulse width detector receives the input clock signal and generates a pulse width datum after computing a pulse width of reference clock signal for the input clock signal. The look-up table contains a number of entries with each entry having a cycle field containing a unique range of numbers of cycles of the input clock signal and a frequency field containing a unique estimated frequency of the input clock signal. The comparing unit receives the pulse width datum and generates a set of comparison signals according to the data stored in the look-up table. The encoder receives the set of comparison signals and generates a selection signal. Each of the frequency dividers receives the input clock signal, respectively divides the frequency of the input clock signal by a different integer and generates a frequency-divided signal. The multiplexer receives and selects one of the input clock signal and the frequency-divided signals as the output clock signal according to the selection signal.

BRIEF DESCRIPTION OF THE DRAWINGS

FIG. 5 is an example of a look-up table according to the invention.

DETAILED DESCRIPTION OF THE INVENTION

The frequency detecting and converting apparatus of the invention will be described with reference to the accompanying drawings.

Figure 1:
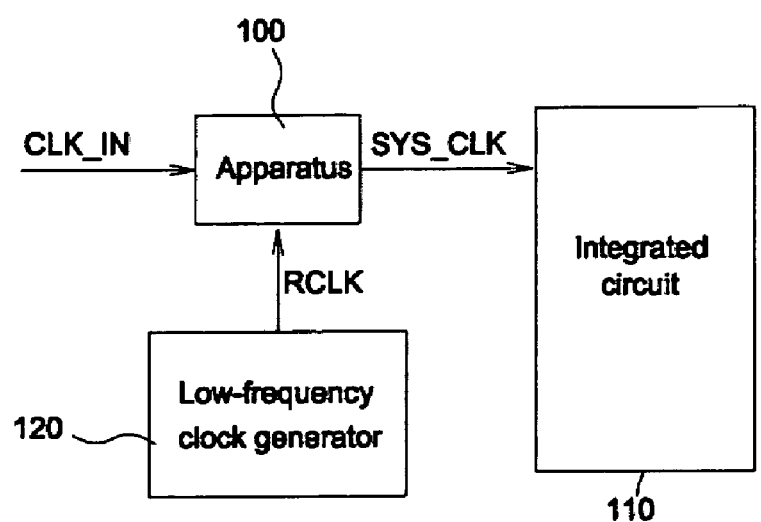
FIG. 1 shows a relation between the invention and an IC.

FIG. 1 shows a relation between the invention and an IC. As shown in FIG. 1, a frequency detecting and converting apparatus 100 automatically detects the frequency of an input clock signal CLK_IN, performs a frequency dividing operation and then provides an output clock signal SYS_CLK to an IC 110. The apparatus 100 also receives a reference clock signal RCLK generated by an internal low-frequency clock generator 120 as a reference clock signal. Accordingly, without manufacturing different ICs for different oscillators, the IC 110 is able to accompany oscillators having different frequencies. Take the USB controller as an example. This IC is allowed to work with an oscillator having a frequency of 6 MHz, 12 MHz, 18 MHz, 24 MHz, or 48 MHz. Or, another system generates a clock to this IC as long as the clock frequency is a multiple of the operating frequency of this IC.

Figure 2:
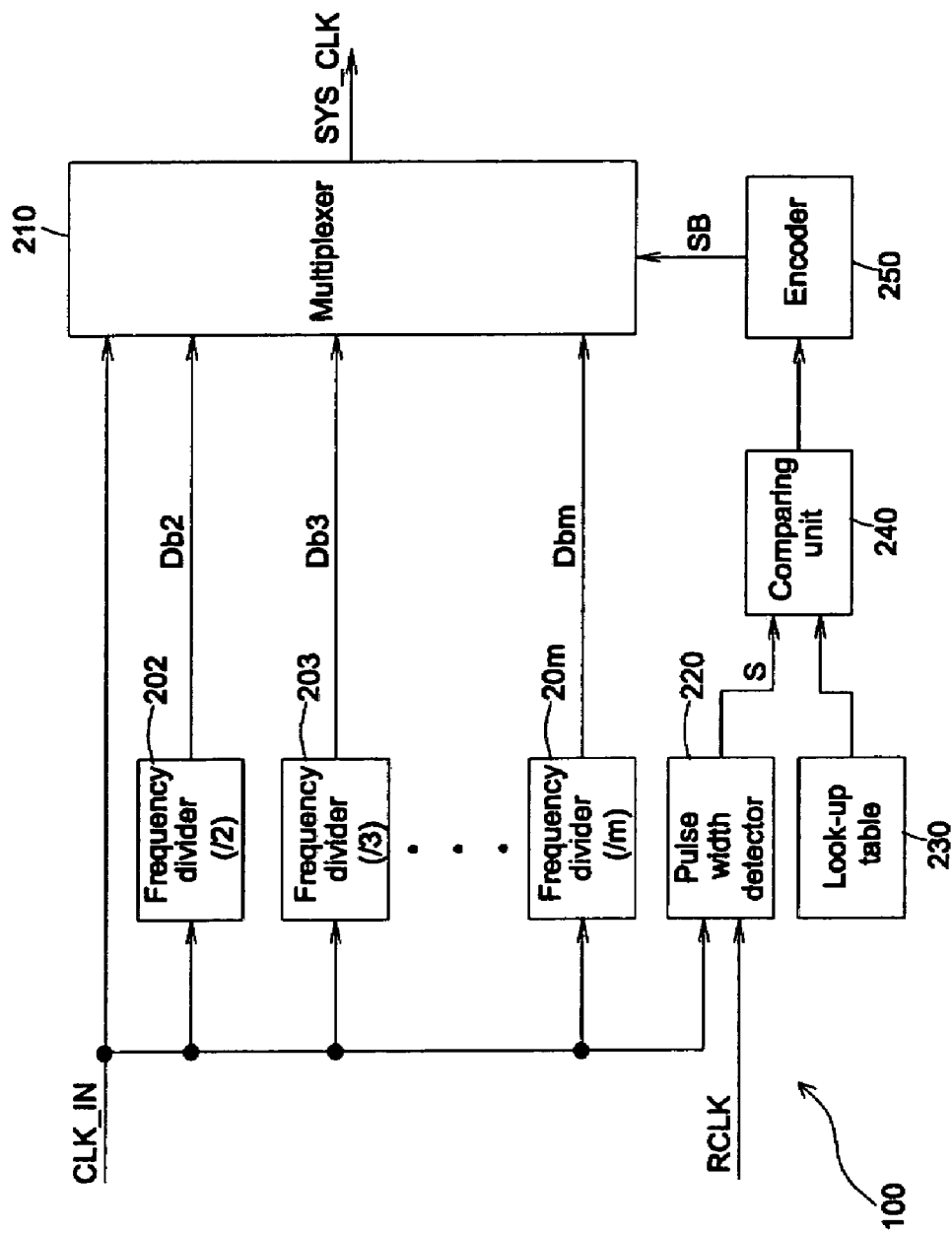
FIG. 2 shows a block diagram of the frequency detecting and converting apparatus according to the invention

FIG. 2 shows a block diagram of the frequency detecting and converting apparatus according to the invention. As shown in FIG. 2, the frequency detecting and converting apparatus 100 receives an input clock signal CLK_IN with an operating frequency $f_1$ and then generates an output clock signal SYS_CLK with an operating frequency $f_2$ according to a reference clock signal RCLK with an operating frequency $f_3$. The apparatus 100 comprises a plurality of frequency dividers 202~20*m*, a multiplexer 210, a pulse width detector 220, a look-up table 230, a comparing unit 240 and an encoder 250.

The pulse width detector 220 receives the input clock signal CLK_IN and the reference clock signal RCLK, computes a number of cycle S of the input clock signal CLK_IN during a cycle (or a half cycle) of the reference clock signal RCLK and then outputs the number of cycle S as a pulse width datum. The look-up table 230 contains a number of entries with each entry having a cycle field containing a unique range of numbers of cycle of the input clock signal and a frequency field containing a unique estimated frequency of the input clock signal. The comparing unit 240 receives the pulse width datum and a set of data in the look-up table 230 to generate a set of comparison signals. The encoder 250 receives and encodes the set of comparison signals to generate a selection signal SB. The frequency dividers 202~20*m* receive the input clock signal CLK_IN, divide respectively the frequency $f_1$ by a different integer number and generate frequency-divided signals Db2~Dbm correspondingly. The multiplexer 210 receives all frequency-divided signals Db2~Dbm and the input clock signal CLK_IN (i.e. dividing the frequency $f_1$ by 1), and consequently selects a signal as the output clock signal SYS_CLK according to the selection signal SB.

Figure 3:
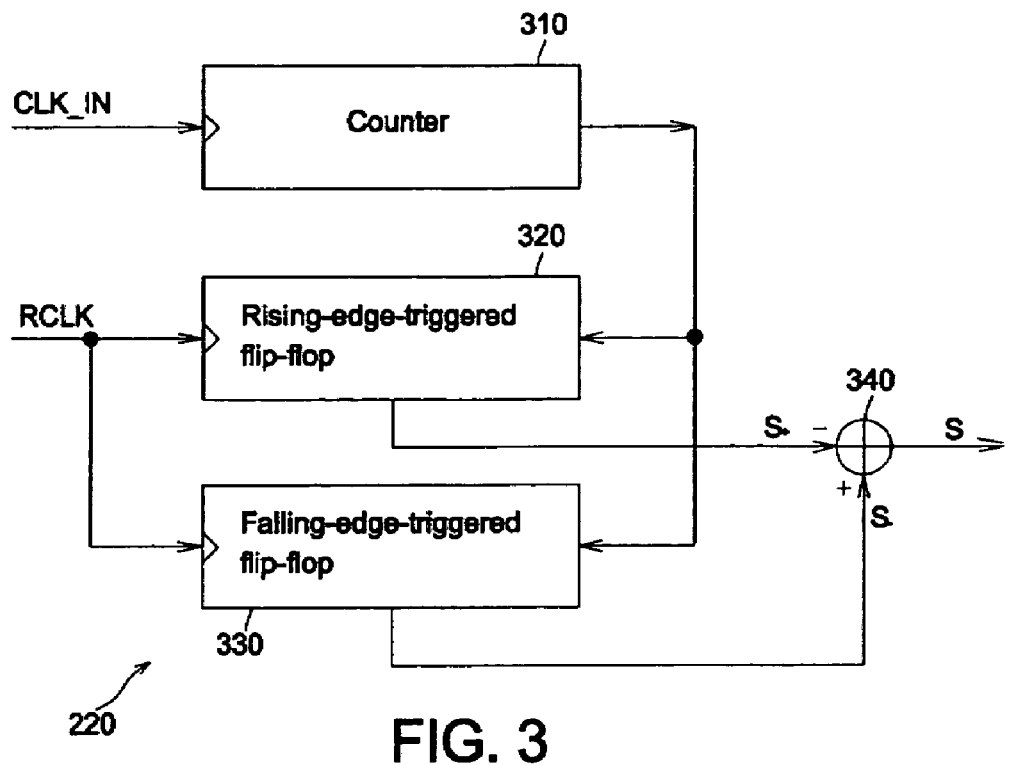
FIG. 3 shows a block diagram of a pulse width detector according to the invention.

FIG. 3 shows a block diagram of a pulse width detector according to the invention. Referring to FIG. 3, the pulse width detector 220 comprises a counter 310, a rising-edge-triggered flip-flop 320, a falling-edge-triggered flip-flop 330 and a subtractor 340. The counter 310 receives the input clock signal CLK_IN, accumulates the number of cycles of the input clock signal CLK_IN and then outputs the number of cycle S from the input clock signal CLK_IN. When the reference clock signal RCLK is at the rising edge, the rising-edge-triggered flip-flop 320 latches the counting value of the counter 310 and then outputs a rising-edge number $S_+$. As the reference clock signal RCLK is at the falling edge, the falling-edge-triggered flip-flop 330 latches the counting value of counter 310 and then outputs a falling-edge number $S_-$. Afterward, the subtractor 340 subtracts the number $S_+$ from the number $S_-$ and then computes an absolute value of the difference between $S_-$ and $S_+$ to generate the pulse width datum (if the difference is negative, a 2's complement of the number $(S_- - S_+)$ will be taken). The pulse width datum is expressed in units of number of cycles of the input clock signal CLK_IN during a half cycle period of the reference clock signal RCLK. Owing to the reference clock signal RCLK with a fixed frequency and the input clock signal CLK_IN with a stable frequency, it is easy to compute the frequency of the input clock signal CLK_IN based on the pulse width datum.

Figure 4:
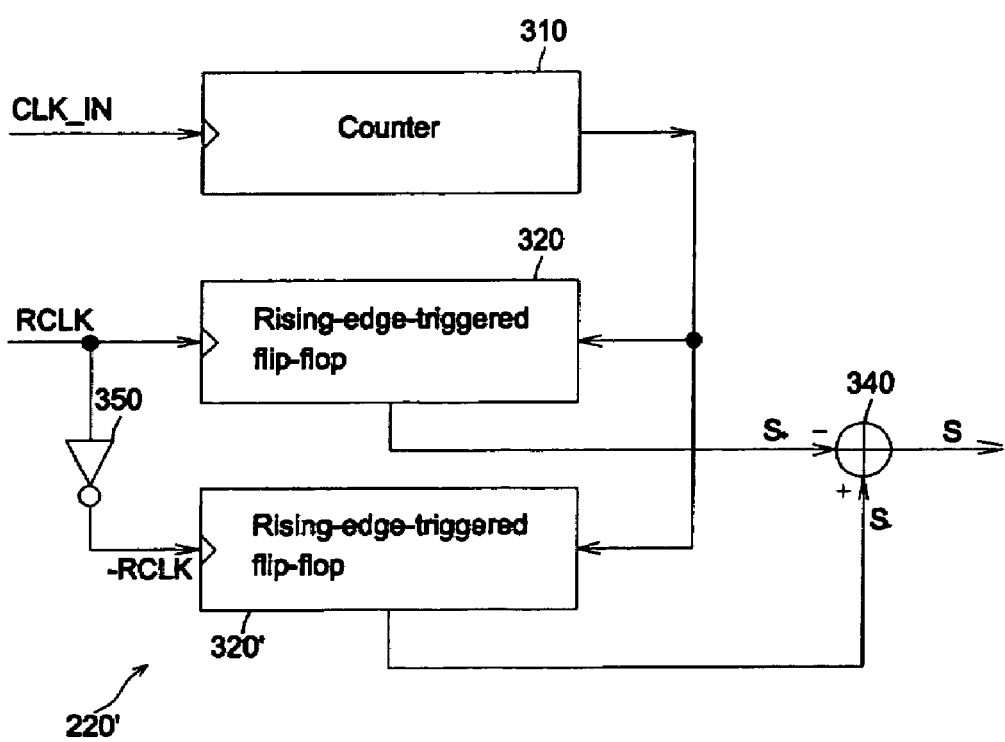
FIG. 4 shows another block diagram of a pulse width detector according to the invention.

Note that a pulse width detector 220' can be implemented with a counter 310, two rising-edge-triggered flip-flops 320, 320', an inverter 350 and a subtractor 340, as shown in FIG. 4. The inverter 350 receives and inverts the reference clock signal RCLK to provide an inverted reference clock signal (-RCLK) for the rising-edge-triggered flip-flop 320'. The rising-edge-triggered flip-flop 320' receives the inverted reference clock signal (-RCLK) and the counting value of the counter 310, and then latches the value. Since the operations of the other devices in FIG. 4 are detailed above, the description is omitted here. However, the pulse width datum generated from the pulse width detector 220' is two times of that of the pulse width detector 220.

FIG. 5 is an example of a look-up table 230 according to the invention. The frequency of the input clock signal CLK_IN is $f_1$, the frequency of the clock SYS_CLK is $f_2$, the cycle length of the output clock signal SYS_CLK is CYC_sys and K is an integer. However, based on the number of cycles of the input clock signal CLK_IN measured during a one-cycle period of the reference clock signal RCLK, the operating frequency of the input clock signal CLK_IN does not come out by mathematical calculation. Instead, the operating frequency $f_1$ of the input clock signal CLK_IN is obtained shortly by the look-up table containing pre-stored numbers of cycles of the input clock signal CLK_IN, the operating frequency $f_2$ of the, dock SYS_CLK and the operating frequency $f_1$ of the input clock signal CLK_IN. Note that FIG. 5 is merely an example of a look-up table and should not be limited to this specific construction and arrangement shown and described. FIG. 5 includes two fields, number of cycle S and its corresponding operating frequency $f_2$ of the output clock signal SYS_CLK. Suppose the cycle length of the reference clock signal RCLK is CYC_rclk; and the cycle length of the output clock signal SYS_CLK is CYC_sys. In addition, CYC_rclk=K*CYC_sys. When the number of cycle generated by the subtractor 340 falls into one of six entries of the number of cycle S field, the estimated frequency $f_1$ of the input clock signal CLK_IN is obtained.

In practice, the look-up table can be stored within a register, a random access memory or a read-only memory in a software form. Also, it can be implemented using a hard-wired logic circuit. When the look-up table exists in a software form, the adjacent comparing unit can be implemented in a firmware format to perform its comparison operations. In contrast, if the look-up table is designed in a hardware form, the adjacent comparing unit can be also implemented with a hard-wired logic circuit to perform its comparison operations.

Take the case of the number of cycle S including six entries in FIG. 5. The comparing unit should include six comparators for generating six comparison signals. No matter which form the comparing unit is implemented with, the comparing unit has to generate a set of comparison signals so that the encoder 250 is able to generate a selection signal SB with respect to the set of comparison signals. According to the selection signal SB, the multiplexer 210 selects one signal among frequency-dividing signals Db2~Dbm and the input clock signal CLK_IN to output as the output clock signal SYS_CLK. Since the circuitry of comparators is well known, the description is omitted here.

Referring to FIG. 2 and FIG. 5, if there is a look-up table as shown in FIG. 5 existing in the frequency detecting and converting apparatus 100 of FIG. 2, it means that the frequency detecting and converting apparatus 100 needs to have five frequency dividers, the divisors of which are 2, 3, 4, 8 and 10, respectively. Thus, the frequency of the input clock signal CLK_IN can be two, three, four, eight and ten times higher than the frequency of the output clock signal SYS_CLK in the frequency detection and converting apparatus 100. For example, on condition that the output clock signal SYS_CLK with a frequency of 100 KHz is required, the frequency of the input clock signal CLK_IN can be 100 KHz, 200 KHz, 300 KHz, 400 KHz, 500 KHz and 1 MHz. Obviously, the more frequency dividers the frequency detecting and converting apparatus 100 includes, the larger the look-up table will grow and accordingly the wider ranges of the frequency of the input clock signal CLK_IN will cover. Therefore, the number of frequency dividers and the divisor values of the frequency detecting and converting apparatus 100 depend on frequency ranges of the input clock signal CLK_IN and design of choice.

In summary, as long as the operating frequency $f_1$ of the input clock signal CLK_IN is a multiple of the operating frequency $f_2$ of the output clock signal SYS_CLK, the operating frequency $f_1$ of the input clock signal CLK_IN can be automatically detected and a corresponding frequency-divided signal is accordingly outputted as the output clock signal SYS_CLK to the IC 100. Consequently, the invention has the option of several frequencies of the input clock signal CLK_IN. As a result, the IC 110 can accompany oscillators having different frequencies without generating different ICs for oscillators having different frequencies, thus increasing flexibility in integrating ICs with oscillators.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A frequency detecting and converting apparatus, for receiving an input clock signal and generating an output clock signal, comprising
    a pulse width detector, for receiving the input clock signal, detecting the pulse width of the input clock signal and outputting the pulse width as a pulse width datum;
    a comparing unit, for receiving the pulse width datum and generating a set of comparison signals after comparing pulse width datum with a plurality of comparison data;
    an encoder, for receiving the set of comparison signals and generating a selection signal;
    a plurality of frequency dividers, for receiving the input clock signal and generating a frequency-divided signal with an individual frequency after respectively dividing the input clock signal by different values; and
    a multiplexer, for receiving the input clock signal and the plurality of frequency-divided signals and outputting one of the input clock signal and the plurality of frequency-divided signals as the output clock signal according to the selection signal.

2. The apparatus of claim 1, wherein the frequency of the input clock signal is a multiple of the frequency of the output clock signal.

3. The apparatus of claim 2, wherein the pulse width detector further receives a reference clock signal, and then counts the number of cycles from the input clock signal as the pulse width datum according to the reference clock signal.

4. The apparatus of claim 3, wherein the pulse width detector comprises:
- a counter, for receiving the input clock signal, counting the number of cycles of the input clock signal and outputting a counting datum;
- a rising-edge-triggered flip-flop, for receiving the reference clock signal, latching the counting datum at the rising edge of the reference clock signal and outputting the latched data as a first latched datum;
- a falling-edge-triggered flip-flop, for receiving the reference clock signal, latching the counting datum at the falling edge of the reference clock signal and outputting the latched data as a second latched datum; and
- a subtractor, for computing an absolute value of the difference of the first latched datum and the second latched datum after subtracting the first latched datum from the second latched datum, and generating the pulse width datum.

5. The apparatus of claim 3, wherein the pulse width detector comprises:
- a counter, for receiving the input clock signal, counting the number of cycles of the input clock signal and outputting a counting datum;
- a first rising-edge-triggered flip-flop, for receiving the reference clock signal, latching the counting datum at the rising edge of the reference clock signal and outputting the latched data as a first latched datum;
- a NOT gate, for receiving and inverting the reference clock signal to output an inverted reference clock signal;
- a second rising-edge-triggered flip-flop, for receiving the inverted reference clock signal, latching the counting datum at the rising edge of the inverted reference clock signal and outputting the latched data as a second latched datum; and
- a subtractor, for computing an absolute value of the difference of the first latched datum and the second latched datum after subtracting the first latched datum from the second latched datum, and generating the pulse width datum.

6. The apparatus of claim 3, further comprising a look-up table for storing and outputting the plurality of comparison data.

7. The apparatus of claim 6, wherein the plurality of comparison data of the look-up table are stored in a register, a random access memory, or a read-only memory.

8. The apparatus of claim 1, wherein the comparing unit comprises a plurality of comparators and is implemented using a hard-wired logic circuit.

* * * * *